(12) United States Patent
Halbritter (10) Patent No.: US 12,470,043 B2
(45) Date of Patent: Nov. 11, 2025

(54) LASER SOURCE, LIDAR SYSTEM AND METHOD FOR CONTROLLING A LASER SOURCE

(71) Applicant: ams-Osram International GmbH, Regensburg (DE)

(72) Inventor: Hubert Halbritter, Dietfurt-Toeging (DE)

(73) Assignee: AMS-OSRAM INTERNATIONAL GMBH, Regensburg (DE)

( * ) Notice: Subject to any disclaimer, the term of this patent is extended or adjusted under 35 U.S.C. 154(b) by 510 days.

(21) Appl. No.: 18/044,388

(22) PCT Filed: Aug. 30, 2021

(86) PCT No.: PCT/EP2021/073894
§ 371 (c)(1),
(2) Date: Mar. 8, 2023

(87) PCT Pub. No.: WO2022/053345
PCT Pub. Date: Mar. 17, 2022

(65) Prior Publication Data
US 2023/0327402 A1    Oct. 12, 2023

(30) Foreign Application Priority Data

Sep. 9, 2020   (DE) ..................... 10 2020 123 560.7

(51) Int. Cl.
*H01S 3/13*   (2006.01)
*G01J 9/02*   (2006.01)
(Continued)

(52) U.S. Cl.
CPC .......... *H01S 5/0622* (2013.01); *G01J 9/0246* (2013.01); *G01S 7/4814* (2013.01); *G01S 17/08* (2013.01);
(Continued)

(58) Field of Classification Search
CPC .. H01S 5/0622; H01S 5/06808; H01S 5/0687; H01S 5/021; H01S 5/183
See application file for complete search history.

(56) References Cited

U.S. PATENT DOCUMENTS 6,323,987 B1    11/2001   Rinaudo et al.
2003/0107746 A1   6/2003   Hedin et al.
(Continued)

FOREIGN PATENT DOCUMENTS

CN        1985419 A      6/2007
CN      102299477 A     12/2011
(Continued)

OTHER PUBLICATIONS

Chinese office action issued for the corresponding Chinese patent application No. 202180055104.0, dated Jul. 29, 2025, 6 pages (for informational purposes only).

(Continued)

*Primary Examiner* — Kinam Park
(74) *Attorney, Agent, or Firm* — VIERING, JENTSCHURA & PARTNER mbB (57) ABSTRACT

A laser source may include a laser diode, a modulation device, and a feedback device. The modulation device may include an electric power source and may be suitable for modifying a current intensity applied to the laser diode, which may modify an emission frequency of the laser diode. The feedback device may be suitable for modifying a current intensity applied to the laser diode by the electric power source as a function of the electromagnetic radiation emitted by the laser diode.

9 Claims, 6 Drawing Sheets

(51) Int. Cl.
| | |
|---|---|
| G01S 7/481 | (2006.01) |
| G01S 17/08 | (2006.01) |
| H01S 5/062 | (2006.01) |
| H01S 5/068 | (2006.01) |
| H01S 5/0687 | (2006.01) |
| H01S 5/02 | (2006.01) |
| H01S 5/183 | (2006.01) |

(52) U.S. Cl.
CPC ........ *H01S 5/06808* (2013.01); *H01S 5/0687* (2013.01); *G01J 2009/0257* (2013.01); *G01J 2009/0288* (2013.01); *H01S 5/021* (2013.01); *H01S 5/183* (2013.01)

(56) References Cited

U.S. PATENT DOCUMENTS

| | | |
|---|---|---|
| 2006/0215716 A1 | 9/2006 | Luo et al. |
| 2008/0131127 A1 | 6/2008 | Lee et al. |
| 2014/0177659 A1 | 6/2014 | Goobar et al. |
| 2021/0083449 A1 | 3/2021 | Wojciechowski et al. |
| 2022/0244178 A1 | 8/2022 | Leitgeb et al. |
| 2024/0088622 A1 | 3/2024 | Sorg et al. |

FOREIGN PATENT DOCUMENTS

| | | |
|---|---|---|
| CN | 111542976 A | 8/2020 |
| DE | 112018005777 T5 | 8/2020 |
| DE | 102019202739 A1 | 9/2020 |
| EP | 1052526 A2 | 11/2000 |

OTHER PUBLICATIONS

Behroozpour, Behnam et al., "Electronic-Photonic Integrated Circuit for 3D Microimaging", IEEE Journal of Solid-State Circuits, vol. 52, No. 1, Jan. 2017, pp. 161-172.

Behroozpour, Behnam et al., "Integrated Circuits for Communications. Lidar System Architectures and Circuits", IEEE Communications Magazine, Oct. 2017, pp. 135-142.

International Search Report for the Corresponding PCT Application No. PCT/EP2021/073894, dated Jan. 4, 2022, 2 pages (for informational purposes only).

LASER SOURCE, LIDAR SYSTEM AND METHOD FOR CONTROLLING A LASER SOURCE

CROSS-REFERENCE TO RELATED APPLICATIONS

The present application is a national stage entry according to U.S.C. § 371 of PCT application No.: PCT/EP2021/073894 filed on Aug. 30, 2021; which claims priority to German patent application DE 10 2020 123 560.7, filed on Sep. 9, 2020; all of which are incorporated herein by reference in their entirety and for all purposes.

TECHNICAL FIELD

A LIDAR system having a laser source is specified, in particular a laser source having a modulation device configured to modify a current intensity and an emission frequency of a laser diode where the laser source further includes a feedback device configured to feed a feedback signal to the modulation device.

BACKGROUND

LIDAR ("Light Detection and Ranging") systems, in particular FMCW LIDAR systems ("Frequency Modulated Continuous Wave" LIDAR systems) are increasingly being used in vehicles, for example for autonomous driving. For example, they are used for measuring distances or for recognizing objects. In order to be able to reliably detect objects at greater distances, laser light sources of appropriately high power are required.

In general, attempts are being made to improve existing LIDAR systems.

In particular, laser sources are being researched the frequency of which may be easily modulated and which exhibit increased temperature stability of the emission wavelength.

It is an objective to provide an improved laser source, an improved LIDAR system, and an improved method for operating a laser source.

SUMMARY

According to embodiments, the object is achieved by the subject matter of the independent patent claims. Advantageous enhancements are defined in the dependent claims.

A laser source comprises a laser diode, a modulation device and a feedback device. The modulation device comprises a current source and is suitable for modifying a current intensity impressed into the laser diode, an emission frequency of the laser diode being modifiable. The feedback device is suitable for modifying a current intensity impressed by the current source into the laser diode as a function of electromagnetic radiation emitted by the laser diode.

For example, the feedback device comprises an interferometer which is suitable for generating a signal from a measuring beam branched off from the emitted electromagnetic radiation, wherein the intensity of the signal changes periodically as a function of an emission wavelength.

According to embodiments, the feedback device is suitable for feeding a feedback signal to the modulation device, the signal being dependent on the intensity in a predetermined wavelength range.

According to embodiments, the feedback device comprises a plurality of interferometers. The measuring beam is divided into a plurality of partial beams each of which is fed to a different interferometer. Furthermore, the feedback device further comprises a selection device which is suitable for selecting the signal of that interferometer which exhibits linear dependence of the intensity on the wavelength.

For example, the interferometer may be a Mach-Zehnder interferometer. According to further embodiments, the interferometer may be a Fabry-Perot interferometer.

For example, components of the feedback device may be integrated into a photonic chip. For example, the feedback device may comprise one or a plurality of interferometers. Interferometer components, such as beam splitter devices or beam combiners, may be implemented as fiber optic components, such as optical splitters or optical couplers.

For example, the laser diode may be a surface-emitting laser diode.

According to embodiments, a LIDAR system comprises the laser source as described above. For example, the LIDAR system may be implemented at least partially as an integrated optical circuit.

A method for controlling a laser source comprises impressing a current intensity into a laser diode, modifying the current intensity impressed into the laser diode, thereby modifying an emission frequency of the laser diode, and controlling the current intensity impressed into the laser diode as a function of electromagnetic radiation emitted by the laser diode.

For example, controlling the current intensity may comprise generating a signal that depends on the emission wavelength, generating a feedback signal from the signal, and controlling the current intensity by using the feedback signal.

For example, the laser diode may be a surface emitting laser diode.

BRIEF DESCRIPTION OF THE DRAWINGS

The accompanying drawings serve to provide an understanding of exemplary embodiments. The drawings illustrate exemplary embodiments and, together with the description, serve for explanation thereof. Further exemplary embodiments and many of the intended advantages will become apparent directly from the following detailed description. The elements and structures shown in the drawings are not necessarily shown to scale relative to each other. Like reference numerals refer to like or corresponding elements and structures.

DETAILED DESCRIPTION

In the following detailed description, reference is made to the accompanying drawings, which form a part of the disclosure and in which specific exemplary embodiments are shown for purposes of illustration. In this context, directional terminology such as "top", "bottom", "front", "back", "over", "on", "in front", "behind", "leading", "trailing", etc. refers to the orientation of the figures just described. As the components of the exemplary embodiments may be positioned in different orientations, the directional terminology is used by way of explanation only and is in no way intended to be limiting.

The description of the exemplary embodiments is not limiting, since other exemplary embodiments may also exist and structural or logical changes may be made without departing from the scope as defined by the patent claims. In particular, elements of the exemplary embodiments described below may be combined with elements from others of the exemplary embodiments described, unless the context indicates otherwise.

The terms "wafer" or "semiconductor substrate" used in the following description may include any semiconductor-based structure that has a semiconductor surface. Wafer and structure are to be understood to include doped and undoped semiconductors, epitaxial semiconductor layers, supported by a base, if applicable, and further semiconductor structures. For example, a layer of a first semiconductor material may be grown on a growth substrate made of a second semiconductor material, for example a GaAs substrate, a GaN substrate, or an Si substrate, or of an insulating material, for example sapphire.

Depending on the intended use, the semiconductor may be based on a direct or an indirect semiconductor material. Examples of semiconductor materials particularly suitable for generating electromagnetic radiation include, without limitation, nitride semiconductor compounds by means of which, for example, ultraviolet, blue or longer-wave light may be generated, such as GaN, InGaN, AlN, AlGaN, AlGaInN, AlGaInBN; phosphide semiconductor compounds by means of which, for example, green or longer-wave light may be generated, such as GaAsP, AlGaInP, GaP, AlGaP; and other semiconductor materials such as GaAs, AlGaAs, InGaAs, AlInGaAs, SiC, ZnSe, ZnO, $Ga_2O_3$, diamond, hexagonal BN; and combinations of the materials mentioned. The stoichiometric ratio of the compound semiconductor materials may vary. Other examples of semiconductor materials may include silicon, silicon germanium, and germanium. In the context of the present description, the term "semiconductor" also includes organic semiconductor materials.

The term "substrate" generally includes insulating, conductive or semiconductor substrates.

The terms "lateral" and "horizontal", as used in the present description, are intended to describe an orientation or alignment which extends essentially parallel to a first surface of a semiconductor substrate or semiconductor body. This may be the surface of a wafer or a chip (die), for example.

The horizontal direction may, for example, be in a plane perpendicular to a direction of growth when layers are grown.

The term "vertical" as used in this description is intended to describe an orientation which is essentially perpendicular to the first surface of a substrate or semiconductor body. The vertical direction may correspond, for example, to a direction of growth when layers are grown.

In the context of this description, the term "electrically connected" means a low-ohmic electrical connection between the connected elements. The electrically connected elements need not necessarily be directly connected to one another. Further elements may be arranged between electrically connected elements.

The term "electrically connected" also encompasses tunnel contacts between the connected elements.

Figure 1A:
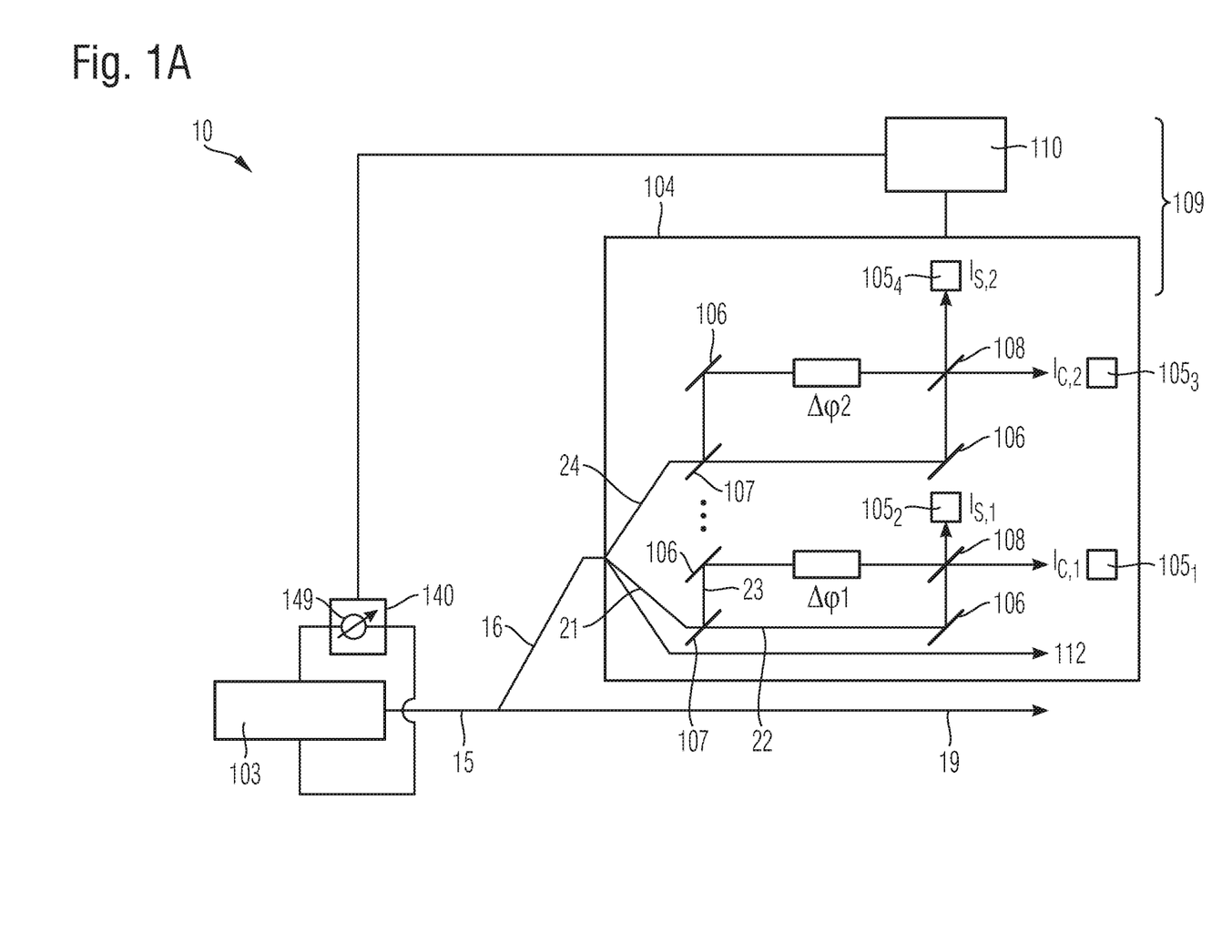
FIG. 1A shows a schematic view of a laser source according to embodiments.

FIG. 1A shows a view of a laser source 10 according to embodiments. The laser source 10 comprises a laser diode 103 and a modulation device 140. The modulation device 140 comprises a current source 149. A current is impressed into the laser diode 103 via the current source 149. The modulation device 140 is suitable for modifying the current intensity impressed into the laser diode 103. As a result, an emission frequency of the laser diode 103 is modifiable. Moreover, the laser source 10 comprises a feedback device 109. The feedback device 109 is suitable for modifying the current intensity impressed into the laser diode as a function of the electromagnetic radiation emitted by the laser diode.

For example, the laser diode 103 may represent a surface-emitting laser diode (VCSEL, "Vertical-Cavity Surface-Emitting Laser"). According to embodiments, the laser diode 103 may also be a laser diode having an optical resonator that extends in a direction perpendicular to a growth direction of the semiconductor layers of the laser diode 103. For example, the laser diode having such a horizontal resonator may comprise further deflection devices, for example reflecting surfaces, by which the emitted light beam 15 may be deflected in any way.

The current source 149 impresses a current into the laser diode 103. By means of a small modification in the impressed current, for example within the range of a few pA, the wavelength may be modified in such a way that the frequency differences of the emitted radiation are in the MHz to GHz range. The modulation of the applied current intensity results in a modulation of the charge carrier density, which leads to a modification of the refractive index in the optical resonator. As a result, the wavelength is shifted. Furthermore, an increased charge carrier density causes an increase in temperature, which also leads to a modification of the emission wavelength. Accordingly, the emission wavelength may be modulated within the MHz to GHz range.

A portion of the emitted beam 15 may be branched off as a measurement beam 16. The remaining portion of the emitted electromagnetic radiation remains as an object beam 19. The intensity of the measuring beam 16 may be less than 10% of the intensity of the emitted electromagnetic radiation 15. For example, the intensity of the measuring beam 16 may be more than 1% of the emitted radiation 15. The measuring beam 16 is fed to a measuring device 104. A signal is generated from the measuring beam by the measuring device 104, wherein the intensity of the signal changes periodically as a function of the emission wavelength. For example, the feedback device 109 may be suitable for feeding a feedback signal to the modulation device 140 which corresponds to an intensity in a predefined wavelength range.

As depicted in FIG. 1A, the measuring beam 16 is divided into partial beams 21, 24 and optionally into a reference measuring beam 112. Each partial beam is fed to a different interferometer 118.

The interferometer 118 may be embodied, for example, as a Mach-Zehnder interferometer, as shown in FIG. 1A. For example, the partial beam 21, 24 is split into two sub-beams 22, 23 each using first beam splitters 107. The first and second sub-beams 22, 23 are finally merged again via a second beam splitter 108 through different optical path lengths and associated deflection mirrors 106.

The first beam splitter 107 may be a partially transmitting mirror, for example. The second beam splitter 108 is implemented, for example, as a Bragg mirror one side of which shifts the phase of the reflected beam by 180°, but the other side does not. This causes constructive interference at one output and destructive interference at the other. As a result, a beam $I_{c,1}$ and a beam $I_{s,1}$ are generated on the one hand. Beam $I_{c,1}$ is detected by a first photodetector 1051. The second beam $I_{s,1}$ is detected by a second photodetector 1052. The first beam $I_{c,1}$ is a beam of an intensity that is proportional to $\cos^2 \varphi\Delta/2$ of the phase difference, resulting from the difference in the different path lengths. The second beam $I_{s,1}$ has an intensity that is proportional to $\sin^2 \varphi\Delta/2$ of the phase difference. For example, the phase difference is calculated as follows:

$$\Delta\varphi = -\Gamma n \frac{2\pi}{\lambda}\Delta L,$$

wherein $\Gamma$ refers to the confinement factor of the system, i.e., the ratio of the radiation portions of the mode in the core and in the cladding region of the waveguide (typically < or approximately equal to 1), and $\lambda$ refers to the emission wavelength. That is, the phase difference and therefore the argument of the sine and cosine functions is wavelength dependent. Furthermore, the phase difference across $\Delta L$ depends on the path length difference between the two paths. As the temperature increases, the emission wavelength and therefore the phase difference changes.

According to embodiments, the measurement beam 16 is divided into several partial beams 21, 24 which are each analyzed by a different interferometer 118. For example, the interferometers 118 split each of the partial beams 21, 24 into first and second sub-beams, each of a different optical path length. The different interferometers 118 are dimensioned such that a different phase difference results for each interferometer. As a result, using the associated interferometer, a different development of the intensity is obtained for each of the split partial beams 21, 24 as a function of the emission wavelength A. Since the development of the dependency as a function of the emission wavelength changes with temperature in the same way for all interferometers, exact wavelength stabilization for the laser itself is no longer necessary.

Figure 2:
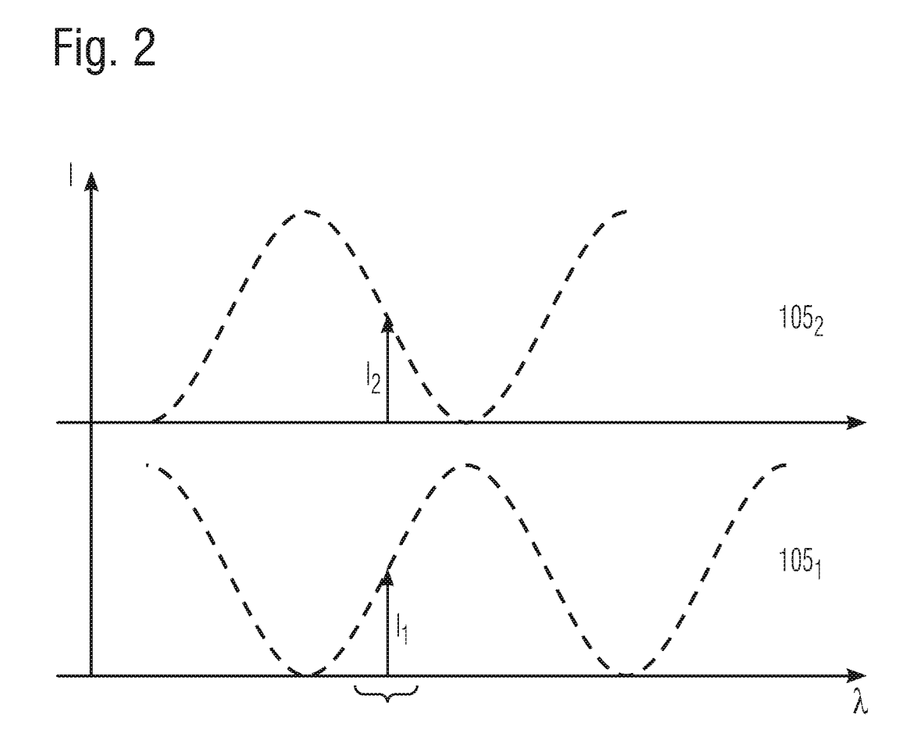
FIG. 2 shows the signals over time in two photodetectors.

FIG. 2 shows an example of signals detected by detectors 105₁, 105₂, respectively. The feedback device 109 comprises a selection device 110 or a controller which is suitable for selecting the signal of that pair of photodetectors 105₁, ..., 105₄ which runs in a linear range. For example, the distance between two maxima may correspond to a frequency of 5 GHz, while the range corresponding to the modulated wavelength is about 1 GHz.

Due to the measuring beam 16 being divided into different partial beams, each of which is fed to different interferometers 118 having different differences in the path length, an interferometer or a photodetector-detector pair 105₁, ..., 105₄ exists at any given point in time in which the intensity changes along with the wavelength in a linear manner. A current signal corresponding to the measured intensity in the linear range is fed to the modulation device 140. As a result, the current intensity impressed by the current source 149 is controlled accordingly. Consequently, it is possible to obtain a stable emission wavelength even when the temperature increases. In particular, the emission wavelength is within a predetermined range.

For example, a path length of the optical path may be within a range of 8 mm.

The optional reference measuring beam 112 may be used, for example, to measure the power of the signal. Since no periodic changes occur within the reference measurement beam 112 and the reference measurement beam is also independent of the wavelength, this signal may be used, for example, for calibration or as a monitor for the power or as a reference to the signals in FIG. 2.

Since two periodic signals are generated by the interferometer 118, as has been described, it is possible to determine the linear range from the signal form. This will be explained in more detail later. As a result, a frequency-amplitude demodulation may take place.

Figure 1B:
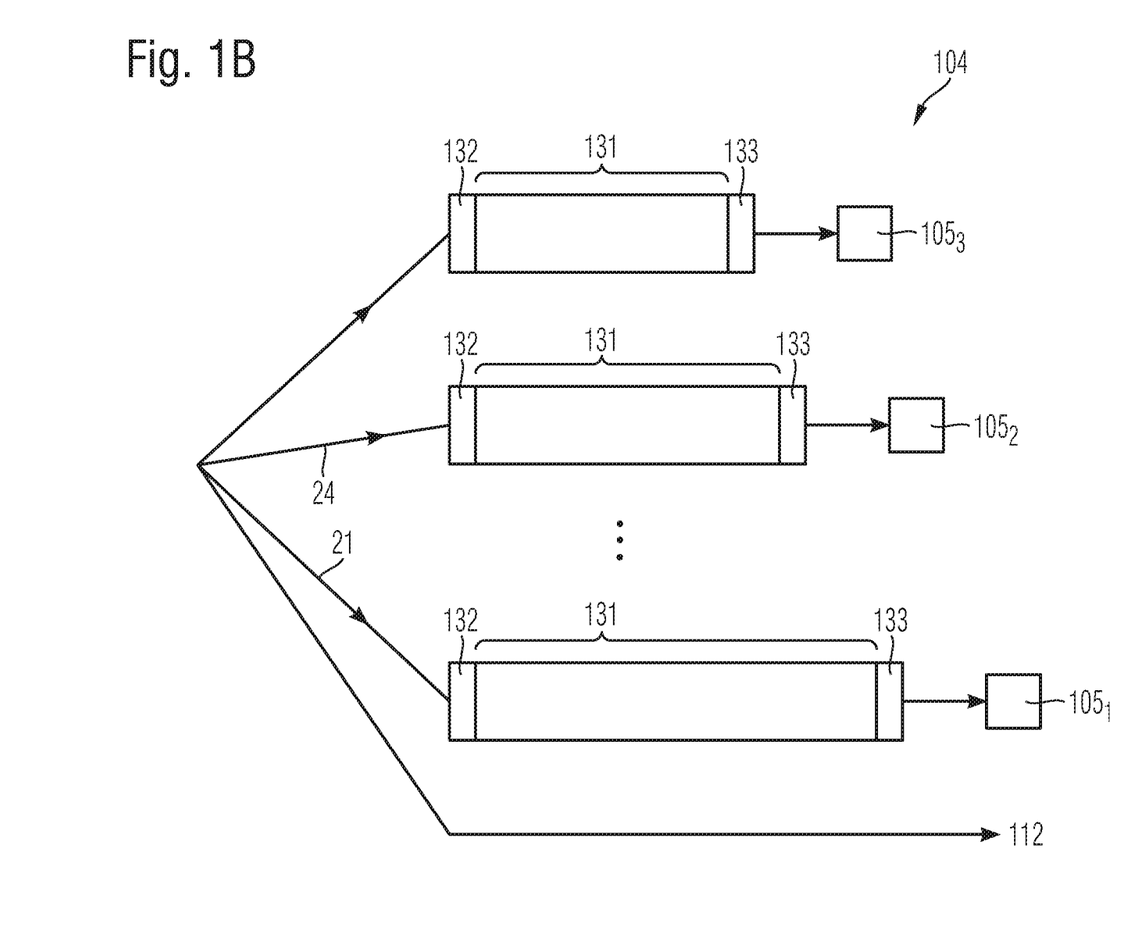
FIG. 1B shows elements of a laser source according to further embodiments.

FIG. 1B shows an alternative embodiment of the interferometer 118. Similar to FIG. 1A, the measurement beam 16 is divided into several partial beams 21, 24. Then the partial beams are each fed to a Fabry-Perot interferometer. Each Fabry-Perot interferometer comprises an optical resonator 131 and a first resonator mirror 132 and a second resonator mirror 133 on opposite sides of the optical resonator 131. Each of the Fabry-Perot interferometers for the corresponding partial beams has a different resonator length. In this case, too, photodetectors 105₁, ..., 105₃ are each arranged at the exit end of the Fabry-Perot interferometer. Since a standing wave is formed in the resonator when the resonator length is an integral multiple of half the wavelength of the incident laser power in the corresponding propagation medium, a periodically changing signal is again formed in the corresponding photodetector 105₁, ..., 105₃. For example, a length of a Fabry-Perot resonator may be about 2 cm. For example, according to FIG. 1B, that partial beam may be selected for which the measured intensity corresponds to a predetermined percentage of the reference measuring beam 112. Within this range, a linear dependence of the intensity on the wavelength may be assumed.

FIG. 2 shows the intensity that is detected by two detectors on a Mach-Zehnder interferometer. As previously described, the intensity detected by photodetector 105₁ is proportional to cost, while the intensity detected by photodetector 105₃ is proportional to $\sin^2 \Delta\varphi/2$. $\Delta\varphi$ corresponds to the phase difference that results from the different path lengths, and is therefore proportional to the wavelength of the emitted radiation. According to embodiments, a wavelength range in which the intensity is linear is determined in each case by detecting the intensity $I_1$ at the first photodetector 105₁ and the intensity $I_2$ at the second photodetector 105₂. If the two intensities $I_1$ and $I_2$ match, this indicates a location in a wavelength range having a linear increase or decrease in intensity, such as at the point "$I_1$" and "$I_2$" in FIG. 2. The selection device 110 is suitable for reading the signals from all photodetectors and for comparing them with one another in pairs. If the intensities of a pair of detectors match, it is assumed that there is a linear increase or decrease in intensity. The signal from the corresponding photodetectors is then used to control the modulation device 140. In this way, active feedback control for the modulation device 140 is performed.

Accordingly, any wavelength drift or manufacturing tolerances of the laser Bragg mirror as compared to the resonator length of the Mach-Zehnder interferometer over temperature are compensated for by measuring the signal using multiple Mach-Zehnder interferometers. The signal from that Mach-Zehnder interferometer which exhibits a linear development is used to control the current applied to the laser diode 103.

Figure 3A:
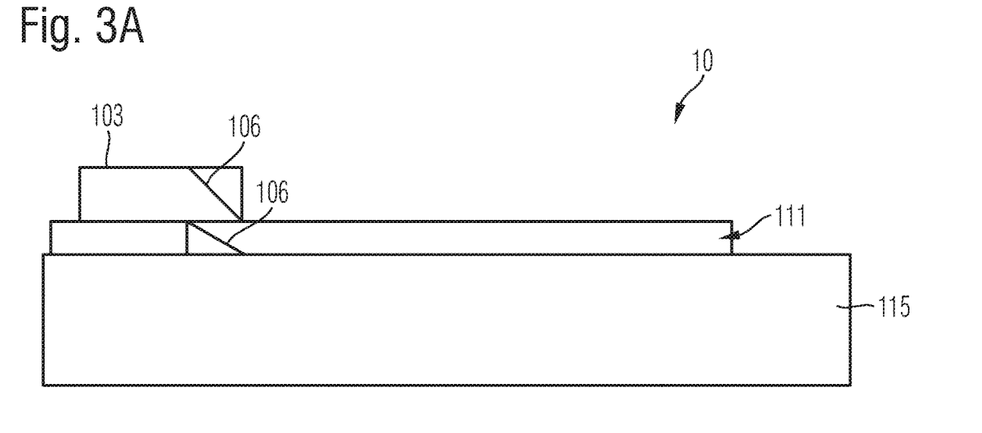
FIG. 3A shows a schematic vertical cross-sectional view of a laser source according to embodiments.

FIG. 3A shows a vertical cross-sectional view of the laser light source 10 according to embodiments. A waveguide arrangement 111 is arranged over an arbitrary substrate 115, for example an insulating substrate. Furthermore, a laser diode 103 is arranged above the substrate 115. Radiation emitted by the laser diode 103 is coupled into the waveguides 111 via deflection mirrors 106, for example. The material of the waveguides may include SiO or SiN, for example. At emission wavelengths of the laser diode 103 of >1000 nm, Si may also be used as the material for the waveguides 111.

For example, the laser diode 103 may be suitable for emitting electromagnetic radiation at a wavelength of more than 850 nm, for example 905 nm. For example, a highly reflective coating may be arranged on one side of the laser diode, while a reflection-reducing coating is provided on another side of the laser diode. In this way, the generated electromagnetic radiation is coupled out at this location. The electromagnetic radiation that is coupled out may be coupled into the waveguide 111 via the deflection mirrors 106, for example. For example, the deflection mirror 106 may also be a prism or a suitable grating. As previously described, a portion of the emitted beam is branched off as a measurement beam 16. For example, the measuring beam may comprise approx. 1 to 10% of the emitted beam 15. Furthermore, the measuring beam 16 may be divided into different partial beams and a reference measuring beam 112.

Figure 3B:
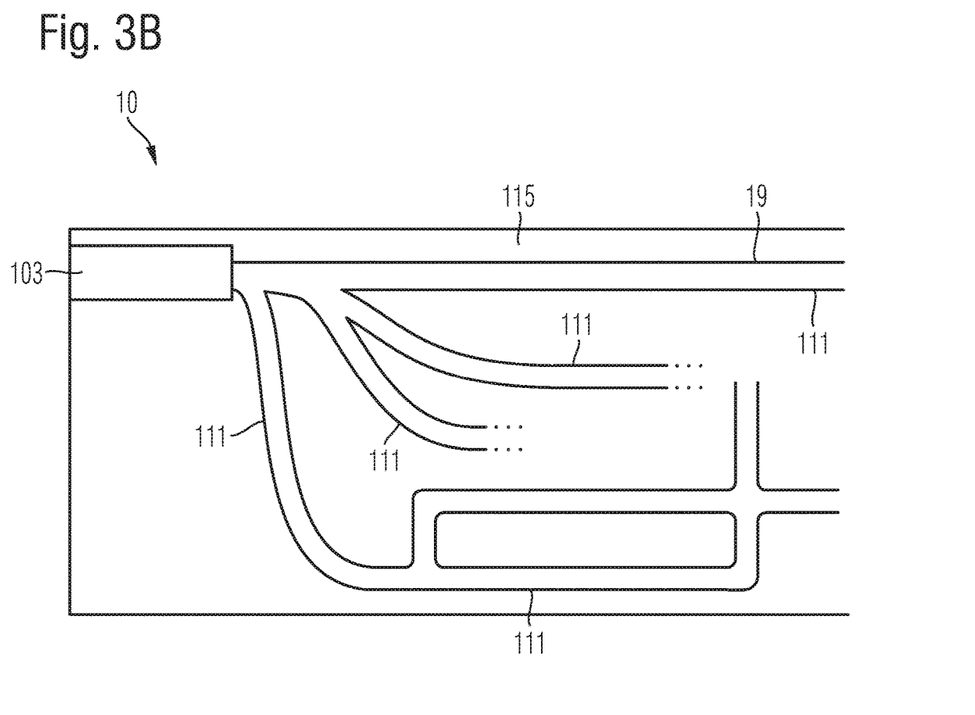
FIG. 3B shows a schematic plan view of a laser source according to embodiments.

FIG. 3B shows a top view of the laser source 10 according to embodiments. As may be seen, the laser source 10 includes a laser diode 103 and an array of waveguides 111. The waveguides 111 are arranged in order to divide a portion of the emitted electromagnetic radiation into a measurement beam 16 and an object beam 19. Furthermore, components of the interferometer are implemented by waveguides 111. The measurement beam 16 is split in a corresponding manner as described above. For example, appropriate integrated optical elements may be used to split the beams and later merge them again. For example, the functionalities may be implemented by splitters, couplers or coupled waveguides.

For example, the different path lengths of the waveguides of a Mach-Zehnder interferometer or a Fabry-Perot interferometer may be implemented in a space-saving manner by forming the waveguides in a meandering shape or by rolling them up.

For example, the waveguide structure shown in FIG. 3B may be manufactured by a photolithographic patterning method by which, for example, the waveguide material, such as Si, SiO or SiN is patterned.

As has been described, a laser diode may be combined with various optical components which represent an interferometer, for example. The optical components may be implemented, for example, in the form of an optical or photonic chip. Correspondingly, the optical components may represent an integrated optical circuit. For example, the laser diode may be integrated with the integrated optical circuit. As a result, a laser source that exhibits a temperature-stable emission wavelength characteristic may be provided.

As has been described, there is always at least one interferometer in an approximately linear range of intensity as a function of wavelength, regardless of the emission wavelength of the laser diode, so that it may be used as an FM-AM demodulator. In this way, temperature fluctuations and manufacturing tolerances may be compensated for automatically. The signal from the photodetectors is converted into a control signal for the modulation device 140.

Figure 4:
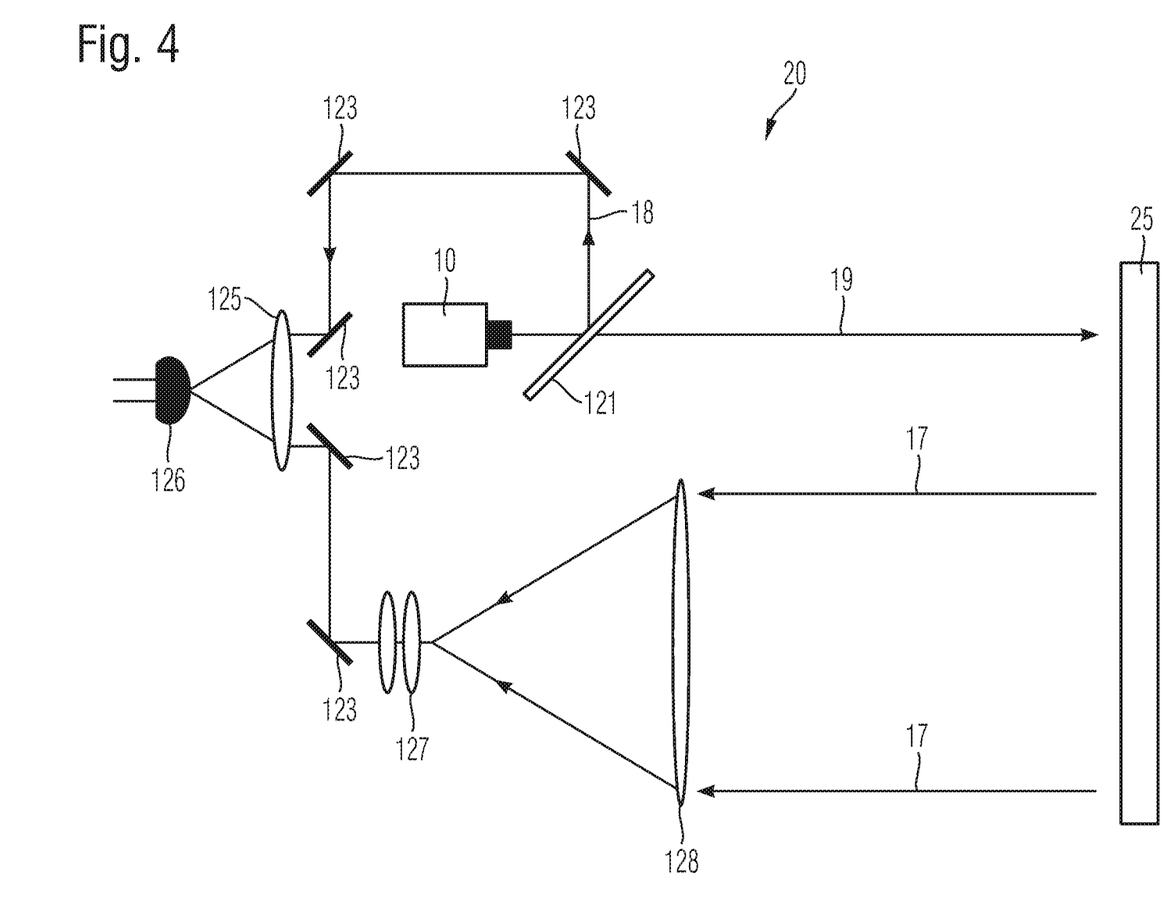
FIG. 4 illustrates a LIDAR system according to embodiments.

The laser source described may be used in a LIDAR system, for example. FIG. 4 shows a schematic view of a LIDAR system 20. The LIDAR system 20 shown in FIG. 4 is an FMCW ("Frequency-Modulated Continuous-Wave")

LIDAR system. The laser radiation emitted by the laser source 10 is of a variable wavelength. The emitted radiation is divided into a reference beam 18 and an object beam 19 by a beam splitter 121. The object beam 19 is radiated onto an object 25 and reflected by it, producing the reflected beam 17. The reflected beam 17 is formed in a suitable manner by receiving optics 128 and a collimator 127 and fed to a detector 150 via the mirror 123 and further optics 125. The reference beam 18 is fed directly to the detector 126 via the mirror 123 and the optics 125. When the reference beam 18 is superimposed on the reflected beam 17, which are mutually coherent, a mixed signal is produced at the detector 126 from which, for example, the distance and other information about the detected object may be evaluated.

A mixed signal of the form $$i_{sig} = i_a + i_{LO} + 2\sqrt{i_a i_{LO}} \cos[2\pi(f_a - f_{LO})t + (\varphi_a - \varphi_{LO})] \quad (1)$$

is detected at the detector 126. In this case, $f_{LO}$ corresponds to the frequency of the object beam 19 or of the reference beam 18 and $f_a$ corresponds to the frequency of the reflected beam 17. The frequency of the reflected beam 17 is delayed due to the propagation time difference that results when it is reflected at the object 25. The difference between $f_a$ and $f_{LO}$ is a measure of the movement and distance of the object 25. The difference frequency of the reference beam 18 and the reflected beam 17 is determined by the photodetector 126. According to embodiments, the LIDAR system or parts thereof may be implemented as an integrated optical circuit. For example, components of the LIDAR systems may be implemented as corresponding fiber optic components.

Figure 5:
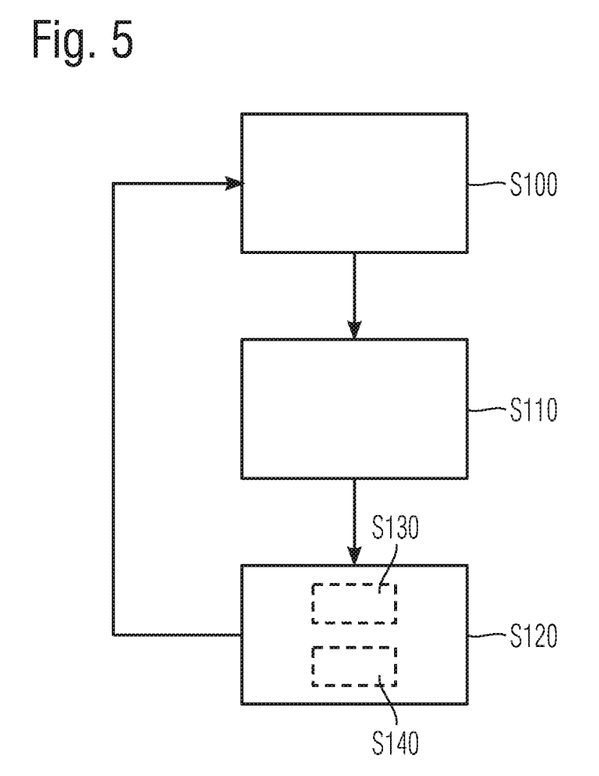
FIG. 5 outlines a method according to embodiments.

FIG. 5 outlines a method according to embodiments. A method for controlling a laser source comprises impressing (S100) a current intensity into a laser diode and modifying (S110) a current intensity impressed into the laser diode, thereby modifying an emission frequency of the laser diode. The method also comprises controlling (S120) the current intensity impressed into the laser diode as a function of electromagnetic radiation emitted by the laser diode.

For example, controlling (S120) the current intensity may comprise generating a signal (S130) which is dependent on the emission wavelength, and generating (S140) a feedback signal from the signal. The current intensity is then controlled by using the feedback signal. The control is carried out continuously.

Although specific embodiments have been illustrated and described herein, those skilled in the art will recognize that the specific embodiments shown and described may be replaced by a multiplicity of alternative and/or equivalent configurations without departing from the scope of the invention. The application is intended to cover any adaptations or variations of the specific embodiments discussed herein. Therefore, the invention is to be limited by the claims and their equivalents only.

LIST OF REFERENCES 10 laser source
15 emitted beam
16 measurement beam
17 reflected beam
18 reference beam
19 object beam
20 LIDAR system
21 first partial beam
22 first sub-beam
23 second sub-beam
24 second partial beam 25 object
103 laser diode
104 measurement device
$105_1, 105_2, \ldots, 105_4$ photodetector
106 deflection mirror
107 first beam splitter
108 second beam splitter
109 feedback device
110 selection device
111 waveguide
112 reference measurement beam
115 substrate
118 interferometer
121 beam splitter
123 mirror
125 optical element
126 detector
127 collimator
128 receiving optics
131 optical resonator
132 first resonator mirror
133 second resonator mirror
140 modulation device
149 current source
S100 impressing a current intensity
S110 changing the current intensity
S120 controlling the current intensity
S130 generating a signal
S140 generating a feedback signal

The invention claimed is:

1. A laser source, comprising:
a laser diode;
a modulation device comprising a current source; wherein the modulation device is configured to modify a current intensity impressed into the laser diode, and thereby modify an emission frequency of the laser diode; and
a feedback device configured to feed a feedback signal to the modulation device, the signal being dependent on the intensity in a predetermined wavelength range;
wherein the feedback device comprises a plurality of interferometers, each of which is configured to generate a signal from a measuring beam branched off from the emitted electromagnetic radiation, the intensity of the signal changing periodically as a function of the emission wavelength, and wherein the measurement beam is divided into a plurality of partial beams, each of which is fed to a different interferometer, and
wherein the feedback device further comprises a selection device configured to select the signal of that interferometer which exhibits linear dependence of the intensity on the wavelength, and to feed the feedback signal to the modulation device, so as to modify a current intensity impressed by the current source into the laser diode as a function of the electromagnetic radiation emitted by the laser diode.

2. The laser source of claim 1, wherein each interferometer is a Mach-Zehnder interferometer.

3. The laser source of claim 1, wherein each interferometer is a Fabry-Perot interferometer.

4. The laser source according to claim 1, wherein components of the feedback device are integrated in a photonic chip.

5. The laser source according to claim 1, wherein the laser diode is a surface-emitting laser diode.

6. A LIDAR system comprising:
the laser source of claim 1.

7. The LIDAR system according to claim 6, which is at least partially implemented as an integrated optical circuit.

8. A method for controlling a laser source, comprising:
impressing a current intensity into a laser diode;
modifying the current intensity impressed into the laser diode, thereby modifying an emission frequency of the laser diode; and
controlling the current intensity impressed into the laser diode as a function of the electromagnetic radiation emitted by the laser diode; wherein controlling the current intensity comprises:
generating a signal from a measuring beam branched off from the emitted electromagnetic radiation, the signal depending on the emission wavelength and its intensity changing periodically as a function of the emission wavelength, and
generating a feedback signal from the signal and controlling the current intensity using the feedback signal, the feedback signal being dependent on the intensity in a predetermined wavelength range, the measurement beam being divided into a plurality of partial beams each of which is fed to a different interferometer, and the signal of that interferometer which exhibits linear dependence of the intensity on the wavelength being selected and fed to the modulation device, so as to modify a current intensity impressed by the current source into the laser diode as a function of the electromagnetic radiation emitted by the laser diode.

9. The method according to claim 8, wherein the laser diode is a surface-emitting laser diode.

* * * * *